United States Patent
Tamura et al.

[11] Patent Number: 5,216,679
[45] Date of Patent: Jun. 1, 1993

[54] SOLID-STATE TUNABLE LASER RESONATOR

[75] Inventors: Koji Tamura; Takashi Arisawa; Toku Shimizu, all of Naka, Japan

[73] Assignee: Japan Atomic Energy Research Institute, Tokyo, Japan

[21] Appl. No.: 688,262

[22] Filed: Apr. 22, 1991

[30] Foreign Application Priority Data

May 30, 1990 [JP] Japan .................................. 2-138424

[51] Int. Cl.⁵ .............................................. H01S 3/10
[52] U.S. Cl. ......................................... 372/20; 372/71; 372/92; 372/102
[58] Field of Search ...................... 372/20, 92, 70, 102, 372/71

[56] References Cited

U.S. PATENT DOCUMENTS 4,254,348  3/1981  Stappaerts ........................... 307/426
4,918,395  4/1990  Difonzo et al. ....................... 372/92

Primary Examiner—James W. Davie
Attorney, Agent, or Firm—Oblon, Spivak, McClelland, Maier & Neustadt

[57] ABSTRACT

A solid state tunable laser resonator having a laser element, an excitation light source for outputting a pumping light, and elements for selecting a wavelength of the pumping light and directing the wavelength of the pumping light onto the laser element at a first point thereof on a first axis substantially parallel to an axis of oscillation light emitted by the laser element. The laser resonator may also include elements for directing the pumping light onto the laser element at a second additional point thereof. The laser resonator can be used as a laser light source having a wide tunable range with a narrow line width.

9 Claims, 4 Drawing Sheets

SOLID-STATE TUNABLE LASER RESONATOR

BACKGROUND OF THE INVENTION (a) Field of the Invention

The present invention relates to a solid-state tunable laser resonator.

(b) Description of the Prior Art

A tunable light source is possible to be applied to isotope separation, high resolving power spectroscopy and uranium enrichment as well as separation and recovery of fission product of spent nuclear fuel, and others.

However, for that purpose, the laser light must be tunable in a wide range and high in output and at the same time must be so narrow in energy width that a small energy width can be exited selectively and thereby a stable spectrum has to be obtained.

As a tunable light source a dye laser has been well known. However, the dye laser is narrow as below 100 mm in tunable zone and is difficult in maintenance because of deterioration problem caused by using a dye which is an organic substance. The dye becomes unstable in action even by its oscillation because of being liquid and therefor it has been difficult to reduce the oscillation line width or to obtain a high output.

SUMMARY OF THE INVENTION

An object of the invention is to solve such problems and to provide a solid-state tunable laser resonator which is possible to be applied to isotope separation. High resolving power spectroscopy and uranium enrichment as well as separation and recovery of fission product of spent nuclear fuel, and others.

As the result of applying themselves to research for attaining this object, the present inventors have discovered that, by using a solid laser crystal having a wide tunable range as 660–990 mm as a laser medium, it can be employed as a laser light source of wide wavelength range and have come to invent the present solid-state tunable laser resonator.

DESCRIPTION OF THE PREFERRED EMBODIMENT

The present solid-state tunable laser resonator is easy to maintain and compact because the laser medium is solid. It is not deteriorated even by the irradiation of high output laser light because the laser medium used is not an organic substance as dye but an inorganic crystal, and is possible to produce a high output.

In the present solid-state tunable laser resonator, the second harmonics of YAG or GSGG laser of semiconductor excitation is used as a light source for excitation, and, for the purpose of obtaining a high gain without damaging crystal, the incidence of laser light to crystal is held simultaneously at two or more places to excite.

In case the intensity of excitation light is lower the gain so obtained is not sufficient and the oscillation becomes unstable, and, if the intensity is too high, the crystal and optical element are damaged. Therefore, in the present solid-state tunable laser resonator, the intensity of incident excitation light is limited to the range of 1.2 $J/cm^2$–3 $J/cm^2$ by evaluating the power of laser light, and thereby a laser oscillation which is high gain and does not damage the crystal and optical element is made possible.

For the purpose of using the present solid-state tunable laser resonator for isotope separation and high resolving power spectroscopy it is necessary to select a light narrow in energy width from wide range of oscillation wavelength. As one of technique therefor such a method as making a light expanded by a beam expander incident on a diffraction grating has hitherto been known. However, in this method, the number of optical elements within the resonator increased, the loss became too large and a problem of damage occurred.

Figure 3A:
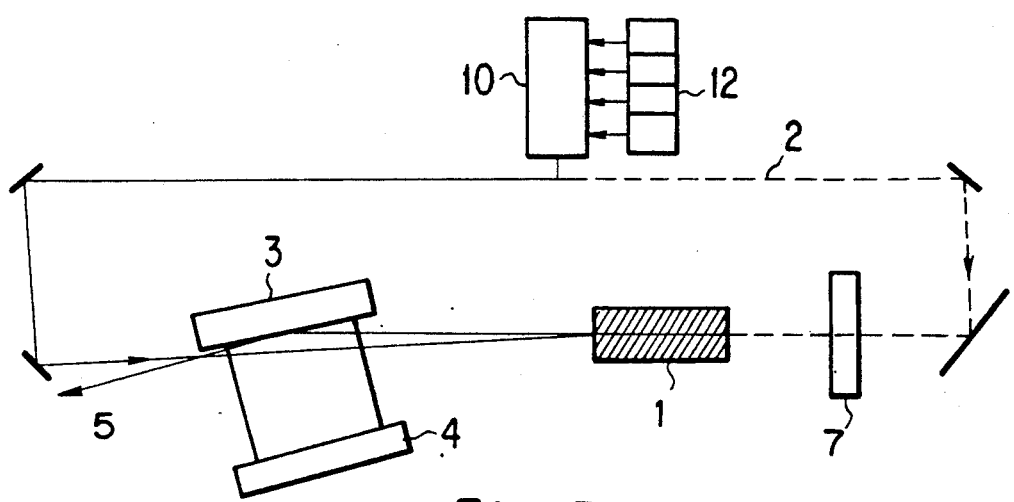
FIGS. 3a and 3b are diagrams of Type 1 and Type 2 solid-state tunable laser resonators.

In the present solid-state tunable laser resonator, it has become possible to reduce energy width of laser light without loss due to reflection and damage of optical element by using a slant incidence method - Type 1 (FIG. 3(a)).

Figure 3B:
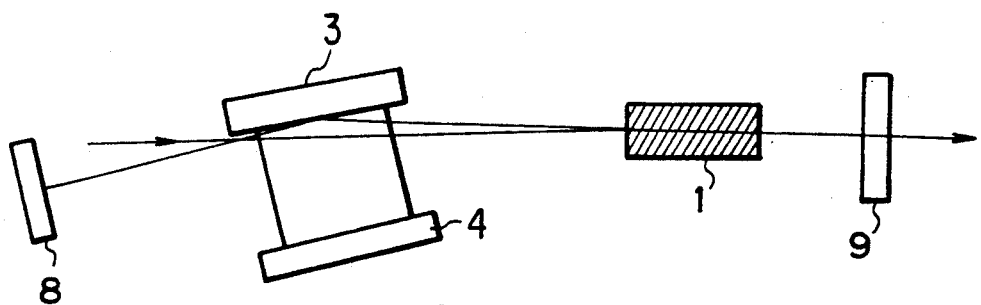

And also it has become possible to further reduce the line width by 3–5 times by using a self-injection method in which zero-degree light emerged out of a diffraction grating is returned thereto by a reflection mirror - Type 2 (FIG. 3(b)).

When the oscillation laser light is of a mutliple mode it is not suitable for isotope separation and spectroscopy since the line width is enlarged. Then, it is necessary to make the the line width of oscillation to a single mode. In the present solid-state tunable laser resonator, a Littman type of wavelength sweeping mechanism having a pivot point in which a mode hop is difficult to arise at the time of wavelength sweeping is employed.

The width of transmission wavelength of slant incidence type of diffraction grating is given by the following formula [K. Liu & M. G. Littman, Opt. Lett., 6, 117 (1981)]:

$$\Delta\lambda/\lambda \sim 2\lambda/\pi L\, (\sin\theta + \sin\phi)$$

Herein, $\lambda$: wavelength;

L: length of diffraction grating;

$\theta$: angle of incident beam; and $\phi$: angle of diffraction beam.

And the mode space of resonator $\Delta f$ becomes $C/2d$.

Herein,

C: velocity of light; and d: length of resonator.

When the length of resonator d is large, the mode space $\Delta f$ of laser light becomes narrow and many modes are produced in the transmission wave length zone of diffraction grating so that a single longitudinal mode of oscillation is impossible.

In the present solid-state tunable laser resonator, only a single longitudinal mode of oscillation is made existent in the transmission wavelength zone of diffraction grating by reducing the length of resonator d sufficiently thereby the single longitudinal mode of oscillation is possible.

The laser wavelength so obtained is converted to a sum frequency with second harmonics, third harmonics, fourth harmonics and basic wave or second harmonics of pump light by using a nonlinear optical element, and thereby a light of shorter wavelength can be obtained by adding a basic oscillation wave thereto.

And, when using titanium sapphire as a solid element, 660~990 nw as a basic wave, 330~495 nm as a second harmonics, 220~330 nm as a third harmonics and 165~248 nm as a fourth harmonics are obtained.

The sum frequency of the basic wave (1.1 μm) of pump light source with the basic wave of titanium sapphire is 413~521 nm, the sum with the second harmonics is 254~341 nm and the sum with the third harmonics is 183~254 nm.

And also the sum of the second harmonics (532 nm) of pump light source with the basic wave of titanium sapphire is 295~346 nm, the sum with the second harmonics is 204~256 nm and the sum with the third harmonics is 156~204 nm.

By obtaining a light in such short wavelength zone the isotope separation of an element having a high excitation energy and the spectroscopy becomes possible.

By using a light source having a wide tunable zone in a narrow energy width obtained by the present solid-state tunable laser resonator, the isotope separation and high resolving power spectroscopy is which an extremely narrow width of energy is required and the separation and recovery of uranium and FP are possible.

EXAMPLE

The present invention will be explained more in detail with an example.

An embodiment of the present solid-state tunable laser resonator will be explained in conjunction with the drawings.

Figure 1:
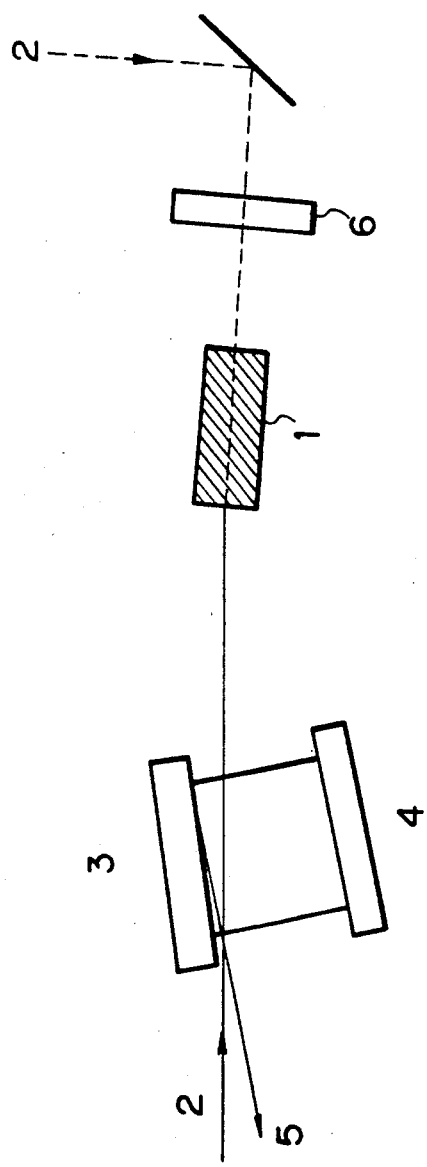
FIG. 1 is a diagram of an embodiment of the present solid-state tunable laser resonator.

FIG. 1 is a diagram of an apparatus of the present solid-state tunable laser resonator used in Example, in which titanium sapphire (5 mm × 5 mm × 20 mm) is used as a solid-state laser element 1, such as titanium sapphire.

Pump light 2 was injected into the crystal at two places by a YAG laser. The selection of wavelength was held by a diffraction grating (1800 l/mm) 3 and a tuning mirror 4.

Output light 5 was a zero-degree light taken out. That is, the excitation light was injected onto almost the same axis as the oscillation light to the titanium sapphire rod at two places thereof by using the second harmonics of YAG laser (10 HzJ) as shown by the dashed lines through total reflection minor 6.

Figure 2A:
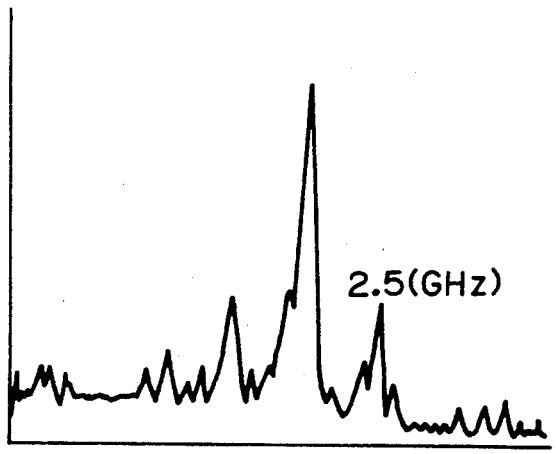
FIGS. 2a and 2b are a graph showing a distribution of frequency of multiple longitudinal mode oscillation 2(a) and that of single longitudinal mode oscillation 2(b), obtained by means of Fabry-Perot interferometer.
Figure 2B:
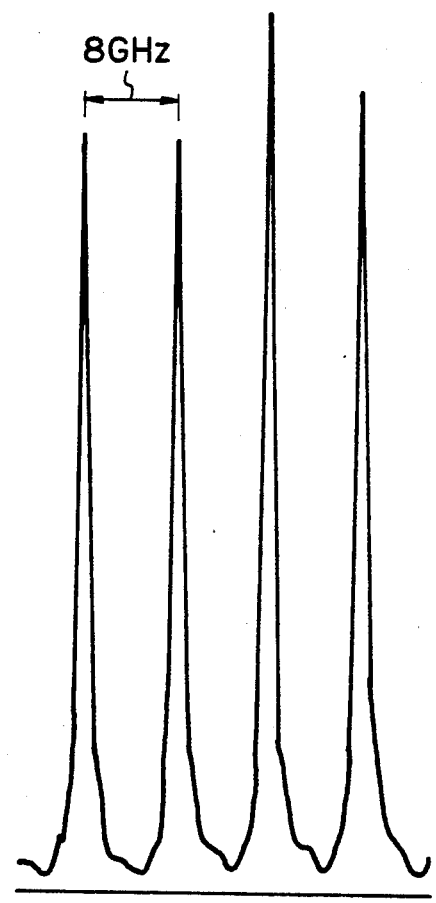

Using a diffraction grating of 1800/mm the laser light was slant injected thereto. The selection of wavelength was held by using a tuning mirror. The oscillation laser light was measured by means of Fabry-Perot interferometer and it was confirmed to be a good light of single longitudinal mode as shown in FIGS. 2(a) and 2(b). The line width was 900 MHz and 3 mJ of output was obtained.

Herein, FIGS. 2a and 2b show a distribution of frequency of oscillation light spectrum of titanium sapphire laser obtained by scanning the Fabry-Perot interferometer. When the length of resonator is long multiple modes exist in the width of transmission wavelength of diffraction grating and multiple longitudinal mode of oscillation (FIG. 2a) is found. However, it is found that, in the present solid-state tunable laser resonator, a single mode of oscillation (FIG. 2b) is obtained by shortening the length of resonator sufficiently for the transmission width.

Further, the present solid-state tunable laser resonator will be generally explained with FIGS. 3a and 3b.

A solid-state laser element 1 wide is tunable zone was used as in a laser medium.

A second harmonics of YAG or GSGG was used for light source 10 excited by semiconductor laser 12.

In Type 1 (FIG. 3(a), the excitation efficiency was enhanced by injecting a pump light onto the both sides of titanium sapphire crystal (shown by dashed line through total reflection mirror 7) or almost the same axis as a laser light.

A diffraction grating 3 was used as a dispersion element. Zero-degree diffraction light 5 was taken out as an output. The selection of wavelength was held by rotating a tuning mirror 4 for the central axis of diffraction grating.

In type 2 FIG. 3(b), the laser light was injected at one place to excite and the line width was reduced by returning back the zerodegree light 5 from the diffraction grating thereto by a reflecting mirror 8. The output was taken out by the output mirror 9.

Figure 4:
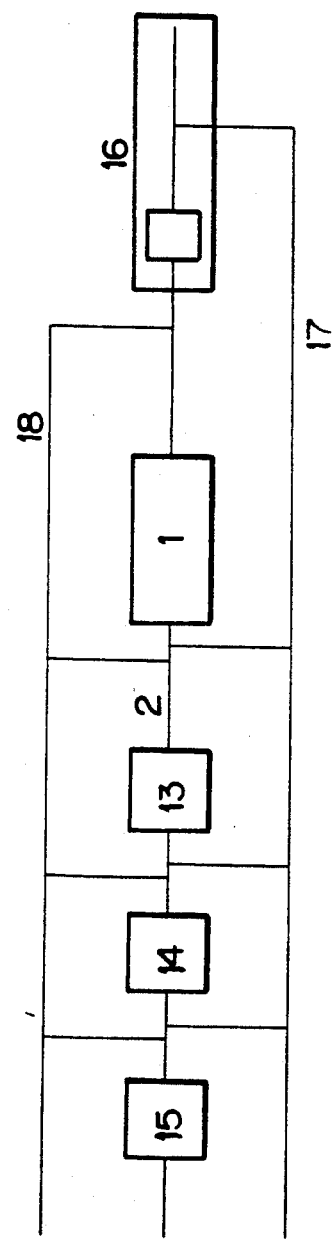
FIG. 4 is a diagram of a tunable zone of solid-state tunable laser resonator.

Furthermore, the tunable portion of solid-state tunable laser will be explained with FIG. 4.

The basic wave 2 obtained from the solid laser 1 was converted to second harmonics 3, third harmonics 4 and fourth harmonics 15 by a nonlinear crystal. And the sum frequencies of basic wave 17 of pump light source 16 and second harmonics 18, respectively, were obtained.

Action and Effect

The present solid-state tunable laser resonator can be applied to:
(1) Separation and recovery of isotope;
(2) Light source for high resolving power spectroscopy;
(3) Uranium enrichment; and
(4) Separation and recovery of long half life nuclide or useful fission products from waste of nuclear fuel reprocessing.

What is claimed is:

1. A solid state tunable laser resonator, comprising:
   a laser element;
   excitation means for outputting a pumping light; and
   means for selecting a wavelength range of said pumping light onto said laser element at a first point and on a first axis substantially parallel to a second axis of an oscillation light emitted by said laser element.

2. A laser resonator as recited in claim 1, further comprising:
   means for directing said pumping light onto said laser element at a second point simultaneously with said pumping light directed onto said first point.

3. A laser resonator as recited in claim 1, comprising means for limiting an intensity of said pumping light in the range of 1.2 to 3.1 $J/cm^2$.

4. A laser resonator as recited in claim 1, wherein said laser element comprises:
   an inorganic crystal rod having a length such that a longitudinal mode space is larger than a zone of transmission wavelength, producing a single longitudinal mode.

5. A laser resonator as recited in claim 1, further comprising:
   self-injection means for returning zero-degree light emitted by said laser element and travelling through said selecting means back onto said laser element.

6. A laser resonator as recited in claim 1, further comprising:
   means for separating said oscillation light into fundamental, second harmonic, third harmonic, and further harmonic components; and
   means for summing at least two of said components of said oscillation light.

7. A laser resonator as recited in claim 1, wherein said excitation means comprises one of a YAG and GSGG semiconductor laser, second harmonics of light being emitted therefrom being used as said pumping light.

8. A laser resonator as recited in claim 1, wherein said means for selecting a wavelength comprises a beam expander for expanding said pumping light and a defraction grating upon which the expanded pumping light is incident.

9. A laser resonator as recited in claim 5, wherein said self-injection means comprises a total reflection mirror.

* * * * *